US006701058B1

United States Patent
Tsubaki (10) Patent No.: US 6,701,058 B1
(45) Date of Patent: Mar. 2, 2004

(54) IMAGE CAPTURING AND RECORDING SYSTEM UTILIZING WIRELESS COMMUNICATION AND IMAGE TRANSMISSION-RECEPTION METHOD THEREOF

(75) Inventor: Hisayoshi Tsubaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/473,127

(22) Filed: Dec. 28, 1999

(30) Foreign Application Priority Data

Dec. 28, 1998 (JP) .......................................... 10-374081

(51) Int. Cl.⁷ ................................................ H04N 5/91
(52) U.S. Cl. ...................... 386/46; 348/143; 348/207.1; 348/211.2
(58) Field of Search ..................... 386/46, 95; 348/143, 348/152, 153, 207.1, 211.2, 211.4, 211.6, 211.99; H04N 5/91

(56) References Cited

U.S. PATENT DOCUMENTS

| | | | | |
|---|---|---|---|---|
| 5,689,442 A | * | 11/1997 | Swanson et al. | 348/143 |
| 5,874,947 A | * | 2/1999 | Lin | 345/169 |
| 6,000,864 A | * | 12/1999 | Hanada | 400/62 |
| 6,304,899 B1 | * | 10/2001 | Cromer et al. | 709/217 |

FOREIGN PATENT DOCUMENTS

JP    6133081    5/1994

* cited by examiner

*Primary Examiner*—Vincent Boccio
(74) *Attorney, Agent, or Firm*—Birch, Stewart, Kolasch & Birch, LLP (57) ABSTRACT

If the residual capacity of a recording medium in an image capturing apparatus becomes five or less, the image capturing apparatus wirelessly transmits a command signal to an image recording apparatus to turn on a power supply of the image recording apparatus. Then, in response to a standby signal from the image recording apparatus, the image capturing apparatus wirelessly transmits the image data recorded in the recording device to the image recording apparatus.

15 Claims, 5 Drawing Sheets

IMAGE CAPTURING AND RECORDING SYSTEM UTILIZING WIRELESS COMMUNICATION AND IMAGE TRANSMISSION-RECEPTION METHOD THEREOF

BACKGROUND OF THE INVENTION

1. Field of the Invention

The present invention relates generally to an image capturing and recording system including an image capturing apparatus and an image recording apparatus and an image transmission-reception method thereof, and more particularly to an image capturing and recording system and an image transmission-reception method for effectively transmitting and receiving images between the image capturing apparatus and the image recording apparatus.

2. Description of Related Art

Images captured by a digital camera are usually recorded in a recording medium (e.g., a memory card) provided in the camera. Then, the images recorded in the memory card are transferred to a personal computer, etc. and stored into a recording medium (e.g., a hard disk) with a large capacity or printed by a printer. After the images are transferred, the recording medium of the camera is cleared. The recording medium of the camera, however, can only record dozens of images, and thus, there is a limitation to the amount of data of images that can be captured. This necessitates a spare recording medium.

In view of the above-mentioned problem, an electronic still camera with a mobile telephone function has been proposed (Japanese Patent Provisional Publication No. 6-133081). This electronic still camera communicates with a server or storage through the mobile telephone system, and stores images captured by the electronic still camera into the server. Therefore, a user can capture images without paying attention to the residual capacity of the recording medium in the camera. According to the conventional electronic still camera with the mobile telephone function, however, it is impossible to prevent the loss of battery in a storage part at the receiving side, and images once transmitted cannot be seen at the camera.

If the images are transmitted to the server in each imaging, the camera transmits radio waves to the storage at the receiving side even if there is no necessity for the transmission, and this results in waste of the battery in the camera. On the other hand, if data is transmitted to the storage by the operation of the user, the user must operate the camera and the operation is complicated.

SUMMARY OF THE INVENTION

In view of the foregoing, it is an object of the present invention to provide an image capturing apparatus, an image recording apparatus and an image transmission-reception method, which prevent the loss of power at the image capturing apparatus and the image recording apparatus, eliminate the necessity of operation to transmit images by the user, and make it possible for the image capturing apparatus to require transmission (retrieval) of the images from the image recording apparatus and erase the images recorded in the image recording apparatus.

To achieve the above-mentioned object, the present invention is directed to an image capturing apparatus, comprising: an imaging part; a first recording part that records a predetermined amount of image data captured by the imaging part; and a communication part that wirelessly communicates with an image recording apparatus comprising at least one of a printer and a second recording part having a capacity larger than the first recording part, and that transmits a first command signal to the image recording apparatus to turn on a main power supply of the image recording apparatus when a residual capacity of the first recording part becomes less than a predetermined threshold and then transmits at least one of the images recorded in the first recording part to the image recording apparatus.

More specifically, if the residual capacity of the small-capacity recording part in the image capturing apparatus is little, the image capturing apparatus transmits the images collectively to the image recording apparatus, thus improving the transmission efficiency and preventing the loss of battery. Moreover, the images can be transmitted automatically without the operation by the user. Further, the command signal for turning on the main power supply of the image recording apparatus at the receiving side is transmitted prior to the transmission of the images in order to activate the image recording apparatus. More specifically, the main power supply of the image recording apparatus is usually off in standby for receiving signals from the image capturing apparatus, and the image capturing apparatus controls the power supply of the image recording apparatus, thus preventing the loss of electricity at the receiving side.

According to the present invention, the communication part transmits the command signal for turning off the power supply of the image recording apparatus when the transmission of the images to the image recording apparatus is completed.

Preferably, the image capturing apparatus further comprises an erasing device that automatically erases, from the first recording part, the at least one of the images having been transmitted to the image recording apparatus. This automatically secures the recording capacity of the small-capacity recording part without the erasing operation by the user.

Preferably, the image capturing apparatus is characterized in that: the communication part wirelessly communicates with the image recording apparatus comprising the second recording part; the image capturing apparatus further comprises a retrieved image selecting device that selects at least one image having been recorded in the second recording part to be transmitted to the image capturing apparatus; and the communication part transmits the first command signal to the image recording apparatus to turn on the power supply to the second recording part when the retrieved image selecting device selects the at least one image to be transmitted to the image capturing apparatus, and then transmits a third command signal to the image recording apparatus to transmit the at least one image selected by the retrieved image selecting device from the image recording apparatus to the image capturing apparatus.

Preferably, the image capturing apparatus is characterized in that: the communication part wirelessly communicates with the image recording apparatus comprising the second recording part; the image capturing apparatus further comprises an erased image selecting device that selects at least one image having been recorded in the second recording part to be erased from the second recording part; and the communication part transmits the first command signal to the image recording apparatus to turn on the power supply to the second recording part when the erased image selecting device selects the at least one image to be erased from the second recording, and then transmits a fourth command signal to the image recording apparatus to erase the at least one image selected by the erased image selecting device from the second recording part.

Preferably, the image capturing apparatus is characterized in that: the communication part wirelessly communicates with the image recording apparatus comprising the second recording part; the image capturing apparatus further comprises a retrieved image selecting device that receives image selection information from the image recording apparatus, and that selects, with reference to the image selection information, at least one image having been recorded in the second recording part to be transmitted to the image capturing apparatus; and when a retrieved image selection procedure at the retrieved image selecting device is started, the communication part transmits the first command signal to the image recording apparatus to turn on the power supply to the second recording part and then transmits a fifth command signal to the image recording apparatus to transmit the image selection information to the image capturing apparatus, and then, when the retrieved image selecting device selects the at least one image to be transmitted to the image capturing apparatus, the communication part transmits a third command signal to the image recording apparatus to transmit the at least one image selected by the retrieved image selecting device from the image recording apparatus to the image capturing apparatus.

Preferably, the image capturing apparatus is characterized in that: the communication part wirelessly communicates with the image recording apparatus comprising the second recording part; the image capturing apparatus further comprises an erased image selecting device that receives image selection information from the image recording apparatus, and that selects, with reference to the image selection information, at least one image having been recorded in the second recording part to be erased from the second recording part; and when an erased image selection procedure at the erased image selecting device is started, the communication part transmits the first command signal to the image recording apparatus to turn on the power supply to the second recording part and then transmits a fifth command signal to the image recording apparatus to transmit the image selection information to the image capturing apparatus, and then, when the erased image selecting device selects the at least one image to be erased from the second recording, the communication part transmits a fourth command signal to the image recording apparatus to erase the at least one image selected by the erased image selecting device from the second recording part.

More specifically, the image capturing apparatus is able to retrieve the images once transmitted. Thus, the image capturing apparatus can retrieve and reproduce the images recorded in the image recording apparatus, and the images can be erased as the need arises. Moreover, the image capturing apparatus is able to erase the images once transmitted and recorded in the image recording apparatus.

The present invention is also directed to an image recording apparatus comprising: a communication part that wirelessly communicates with an image capturing apparatus and receives at least one image from the image capturing apparatus; a power supply part that makes the communication part on standby for receiving a first command signal to turn on a main power supply from the image capturing apparatus, and that turns on the main power supply in response to the first command signal from the image capturing apparatus and then turns off the main power supply and makes the communication part on the standby upon at least one of receipt of a second command signal to turn off the main power supply from the image capturing apparatus and passage of a predetermined period after completion of reception of the at least one image from the image capturing apparatus; and at least one of a printer and a recording part that records the at least one image received from the image capturing apparatus after the main power supply is turned on.

The present invention is also directed to an image capturing and recording system comprising an image capturing apparatus and an image recording apparatus, wherein: the image capturing apparatus comprises: an imaging part; a first recording part that records a predetermined amount of image data captured by the imaging part; and a first communication part that wirelessly communicates with the image recording apparatus and that transmits a first command signal to the image recording apparatus to turn on a main power supply of the image recording apparatus when a residual capacity of the first recording part becomes less than a predetermined threshold and then transmits at least one of the images recorded in the first recording part to the image recording apparatus; and the image recording apparatus comprises: a second communication part that wirelessly communicates with the image capturing apparatus and receives the at least one of the images transmitted from the image capturing apparatus; a power supply part that makes the communication part on standby for receiving the first command signal from the image capturing apparatus, and that turns on the main power supply in response to the first command signal from the image capturing apparatus and then turns off the main power supply and makes the communication part on the standby for receiving the first command signal upon at least one of receipt of a second command signal to turn off the main power supply from the image capturing apparatus and passage of a predetermined period after completion of reception of the at least one of the images from the image capturing apparatus; and at least one of a printer and a second recording part having a capacity larger than the first recording part, the at least one of the printer and the second recording part recording the at least one of the images received from the image capturing apparatus after the main power supply is turned on.

More specifically, the image capturing apparatus transmits the command signal for turning on the main power supply of the image recording apparatus at the receiving side when the residual capacity of the small-capacity recording part becomes less than the predetermined capacity, so that the image recording apparatus is activated, and then, the images are automatically transmitted. On the other hand, the image recording apparatus at the receiving side turns on the power supply to be activated from being on standby for receiving signals in response to the command signal for turning on the main power supply. Then, the large-capacity recording part or the printer records the received images.

The present invention is also directed to an image transmission-reception method for transmitting and receiving images between an image capturing apparatus and an image recording apparatus, wherein: the image capturing apparatus transmits a first command signal to the image recording apparatus to turn on a main power supply of the image recording apparatus when the amount of image data recorded in a first recording part of the image capturing apparatus reaches a predetermined number, and then transmits at least one of the images recorded in the first recording part to the image recording apparatus; and the image recording apparatus turns on the main power supply in response to the first command signal from the image capturing apparatus to get activated from being on standby for receiving the first command signal from the image capturing apparatus, and then receives the at least one of the images transmitted from the image capturing apparatus and records the at least one of the images received from the image capturing apparatus on at least one of printing paper and a second recording part having a capacity larger than the first recording part.

Preferably, the image capturing apparatus automatically erases, from the first recording part, the at least one of the images having been transmitted to the image recording apparatus.

Preferably, the image capturing apparatus transmits a second command signal to the image recording apparatus to turn off the main power supply of the image recording apparatus when transmission of the at least one of the images recorded in the first recording part to the image recording apparatus is completed; and the image recording apparatus turns off the main power supply and becomes on the standby upon receipt of the second command signal to turn off the main power supply from the image capturing apparatus.

Preferably, the image recording apparatus turns off the main power supply and becomes on the standby upon passage of a predetermined period after completion of reception of the at least one of the images from the image capturing apparatus.

Preferably, the image recording apparatus records the at least one of the images received from the image capturing apparatus; when at least one image having been recorded in the image recording apparatus to be transmitted to the image capturing apparatus is selected, the image capturing apparatus transmits the first command signal to turn on the power supply of the image recording apparatus and then transmits a third command signal to the image recording apparatus to transmit the at least one image selected by the image capturing apparatus from the image recording apparatus to the image capturing apparatus; and the image recording apparatus turns on the power supply in response to the first command signal from the image capturing apparatus to get activated from being on the standby, and transmits, in response to the third command signal, the at least one image recorded in the image recording apparatus corresponding to the third command signal to the image capturing apparatus.

Preferably, the image recording apparatus records the at least one of the images received from the image capturing apparatus; when at least one image having been recorded in the image recording apparatus to be erased from the image recording apparatus is selected, the image capturing apparatus transmits the first command signal to turn on the power supply of the image recording apparatus and then transmits a fourth command signal to the image recording apparatus to erase the at least one image selected by the image capturing apparatus from the image recording apparatus; and the image recording apparatus turns on the power supply in response to the first command signal from the image capturing apparatus to get activated from being on the standby, and erases, in response to the fourth command signal, the at least one image recorded in the image recording apparatus corresponding to the fourth command signal.

Preferably, the image recording apparatus records the at least one of the images received from the image capturing apparatus; when a retrieved image selection procedure to select at least one image having been recorded in the image recording apparatus to be transmitted to the image capturing apparatus is started, the image capturing apparatus transmits the first command signal to turn on the power supply of the image recording apparatus and then transmits a fifth command signal to the image recording apparatus to transmit image selection information to be used in the retrieved image selection procedure to the image capturing apparatus; the image recording apparatus turns on the power supply in response to the first command signal from the image capturing apparatus to get activated from being on the standby, and transmits the image selection information to the image capturing apparatus in response to the fifth command signal; when the at least one image to be transmitted to the image capturing apparatus is selected at the image capturing apparatus, the image capturing apparatus transmits a third command signal to the image recording apparatus to transmit the at least one image selected by the image capturing apparatus from the image recording apparatus to the image capturing apparatus; and the image recording apparatus transmits, in response to the third command signal, the at least one image recorded in the image recording apparatus corresponding to the third command signal to the image capturing apparatus.

Preferably, the image recording apparatus records the at least one of the images received from the image capturing apparatus; when an erased image selection procedure to select at least one image having been recorded in the image recording apparatus to be erased from the image recording apparatus is started, the image capturing apparatus transmits the first command signal to turn on the power supply of the image recording apparatus and then transmits a fifth command signal to the image recording apparatus to transmit image selection information to be used in the erased image selection procedure to the image capturing apparatus; the image recording apparatus turns on the power supply in response to the first command signal from the image capturing apparatus to get activated from being on the standby, and transmits the image selection information to the image capturing apparatus in response to the fifth command signal; when the at least one image to be erased from the image recording apparatus is selected at the image capturing apparatus, the image capturing apparatus transmits a fourth command signal to the image recording apparatus to erase the at least one image selected by the image capturing apparatus from the image recording apparatus; and the image recording apparatus erases, in response to the fourth command signal, the at least one image recorded in the image recording apparatus corresponding to the fourth command signal.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
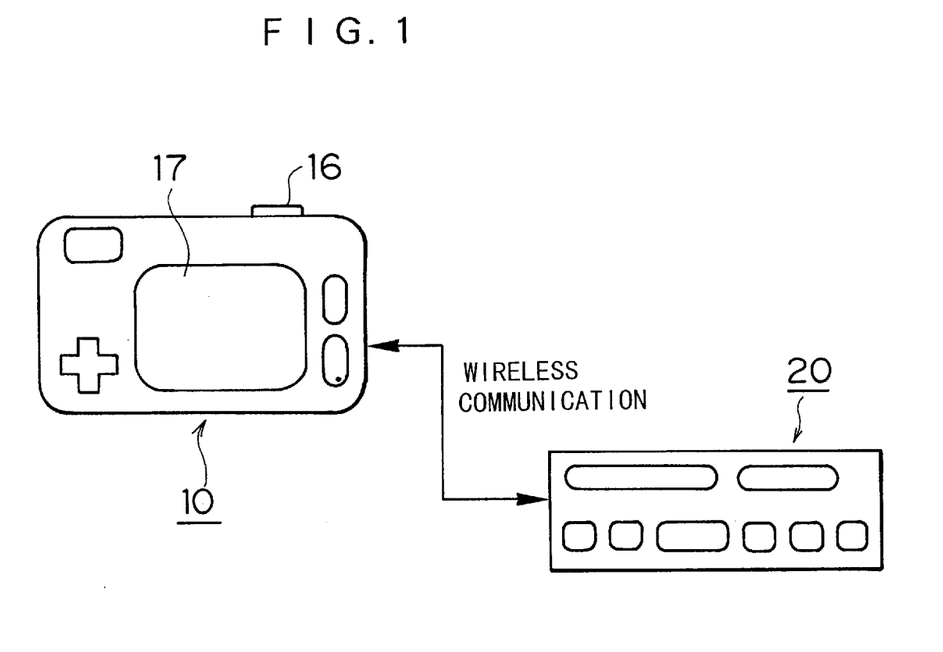
FIG. 1 is an outside drawing showing an embodiment of an image capturing and recording system according to the present invention.
Figure 2:
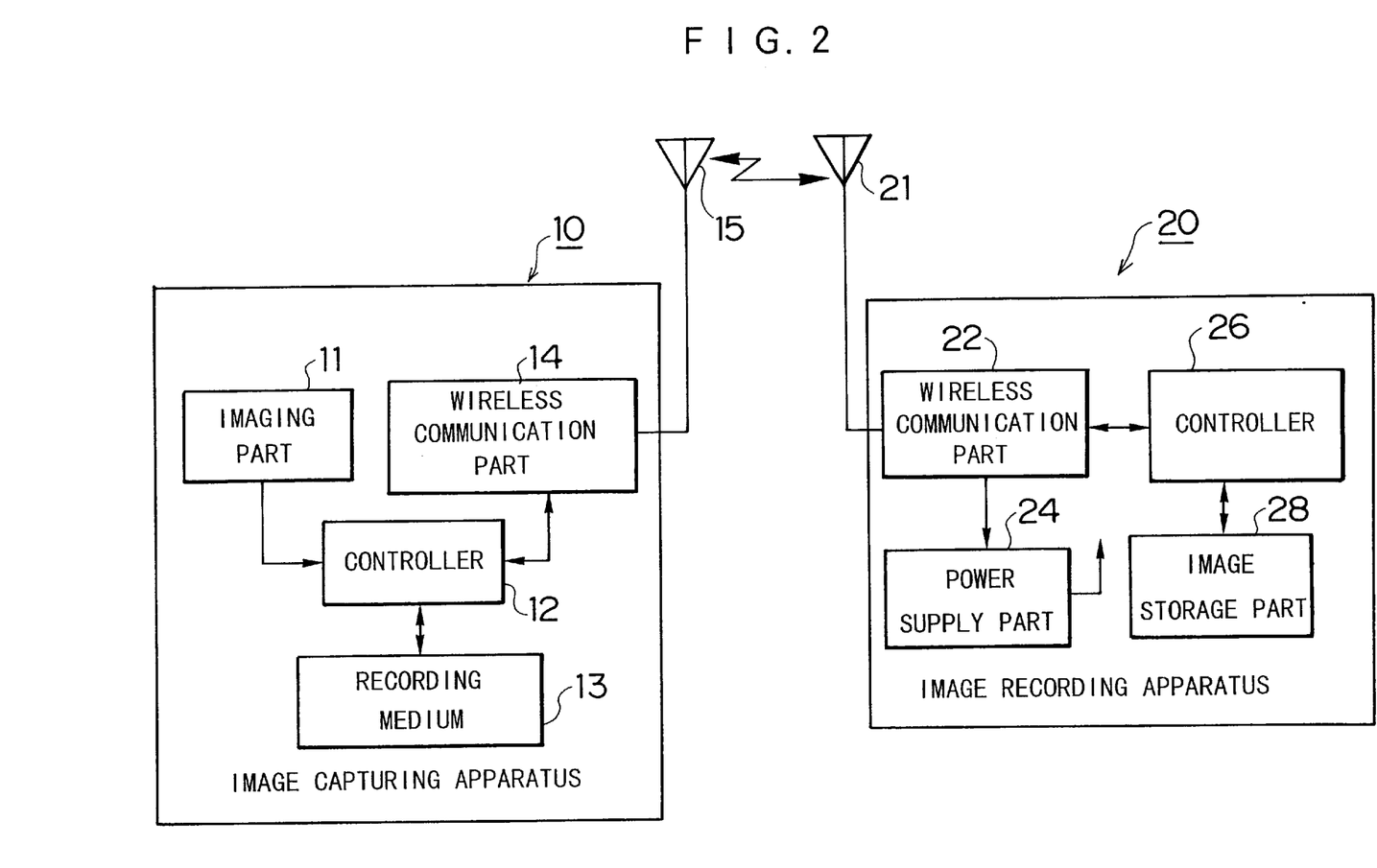
FIG. 2 is a block diagram showing the outline of the image capturing and recording system in FIG. 1.

FIG. 1 is an outside drawing showing an image capturing and recording system, and FIG. 2 is a block diagram thereof. As shown in FIGS. 1 and 2, the image capturing and recording system comprises an image capturing apparatus 10 and an image recording apparatus 20.

The image capturing apparatus 10 comprises an imaging part 11, a controller 12, a recording medium 13 such as a memory card and a RAM, and a wireless communication part 14. The image capturing apparatus 10 is a digital camera having a communication function of wirelessly transmitting image data recorded in the recording medium 13 to the image recording apparatus 20.

The imaging part 11 includes a taking lens, an iris, an imaging device, a signal processing circuit, and the like. When a shutter release button 16 (shown in FIG. 1) is pressed, an image light of an object, which enters the imaging device through the taking lens and the iris, is converted into electric signals, which are then processed appropriately in the imaging part 11. Then, the electric signals are outputted as image data to the controller 12. The controller 12 controls the memory, the communication, and the like of the image capturing apparatus 10, and also records the image data that is outputted from the imaging part 11 during the imaging into the recording medium 13.

When the residual or available capacity of the recording medium 13 gets little, the wireless communication part 14 transmits a command signal to control a power supply of the image recording apparatus 20 through an antenna 15 according to a command from the controller 12, and transmits the image data recorded in the recording medium 13 to the image recording apparatus 20.

On the other hand, the image recording apparatus 20 comprises a wireless communication part 22, a power supply part 24, a controller 26 and an image storage part 28. The image recording apparatus 20 has a communication function of recording the image data transmitted from the image capturing apparatus 10.

The wireless communication part 22 is normally on standby for receiving signals from the image capturing apparatus 10. Upon receipt of the command signal for turning on the power supply from the image capturing apparatus 10 through an antenna 21, the wireless communication part 22 turns on the power supply part 24 to supply the power to each part of the image recording apparatus 20 so as to enable the recording operation.

Upon receipt of the image data from the image capturing apparatus 10 through the antenna 21 and the wireless communication part 22, the controller 26 records the image data in the image storage part 28. Then, upon receipt of a command signal for turning off the power supply from the image capturing apparatus 10 through the antenna 21, the power supply from the power supply part 24 is stopped, and the wireless communication part 22 comes to be on standby for receiving signals.

A description will now be given of the operation of the image capturing apparatus 10 and the image recording apparatus 20 with reference to the flow charts of FIGS. 3, 4 and 5.

Figure 3:
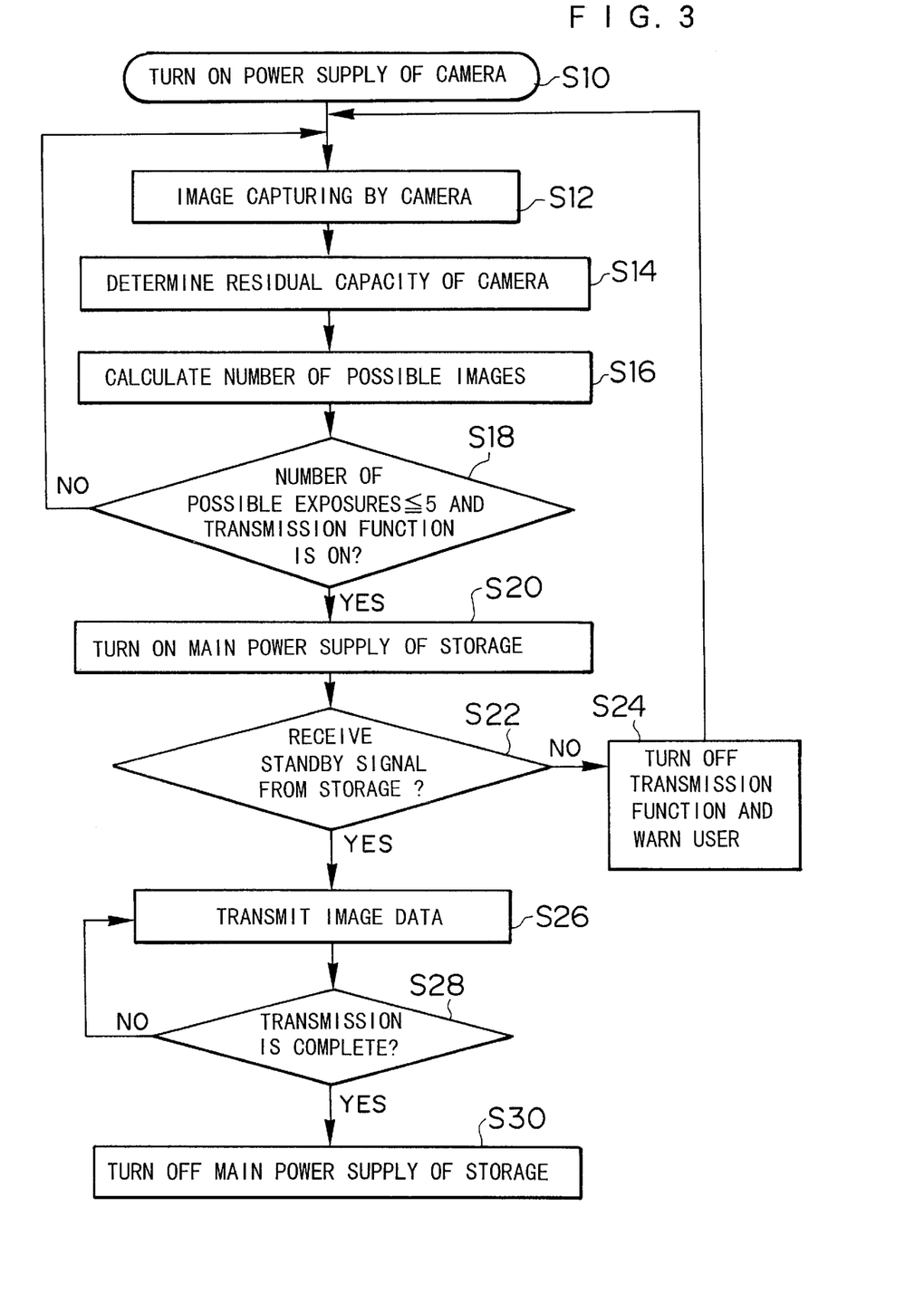
FIG. 3 is a flow chart of assistance in explaining the operation of the image capturing and recording system in FIG. 1.

As shown in FIG. 3, after the power supply of the image capturing apparatus 10 (referred to as a "camera" in the flow charts) is turned on (S10), if the shutter release button is pressed, the imaging part 11 captures an image and the captured image data is recorded in the recording medium 13 through the controller 12 (S12). Then, the controller 12 determines the residual capacity of the recording medium 13 (S14), and calculates the amount of the image data (i.e., the number of images) that the recording medium 13 can further record according to the determined residual capacity (S16). The recording medium 13 of the image capturing apparatus 10 has a small capacity; e.g., the maximum number of recordable images is twenty.

Then, the controller 12 determines whether the number of recordable images (possible times of image-capturing) calculated at S16 is not more than five and the transmission function is on (S18). If no at S18, the process goes back to S12. If yes at S18, the residual capacity of the recording medium 13 is determined as being little and the process goes to S20.

At S20, the wireless communication part 14 of the image capturing apparatus 10 transmits the command signal to turn on the power supply of the image recording apparatus 20 (referred to as a "storage" in the flow charts) through the antenna 15 in order to turn on the main power supply to enable the recording operation of the image recording apparatus 20. When the main power supply of the image recording apparatus 20 is turned on, the image recording apparatus 20 transmits a standby signal from the wireless communication part 22 through the antenna 21 to indicate that the image recording apparatus 20 is ready to receive image data. The image capturing apparatus 10 determines whether it has received the standby signal or not (S22). If no at S22, the image capturing apparatus 10 determines that it is impossible to communicate with the image recording apparatus 20 (e.g., a radio wave cannot reach the image capturing apparatus 10), and the image capturing apparatus 10 warns the user of the impossibility of communication with the image recording apparatus 20 by displaying this information on a liquid crystal monitor 17 (FIG. 1) of the image capturing apparatus 10 and turns off the transmission function of the image capturing apparatus 10 (S24).

If yes at S22, the image capturing apparatus 10 transmits the image data recorded in the recording medium 13 to the image recording apparatus 20 through the wireless communication part 14 and the antenna 15 (S26). The image recording apparatus 20 receives the image data transmitted from the image capturing apparatus 10 through the antenna 21 and the wireless communication part 22, and stores the image data in the image storage part 28, which has large capacity, through the controller 26.

Then, the image capturing apparatus 10 determines whether all the image data recorded in the recording medium 13 have already been transmitted or not (S28). If the transmission of all the image data is complete, the image capturing apparatus 10 transmits the command signal for turning off the power supply of the image recording apparatus 20 (S30). In response to this command signal, the image recording apparatus 20 turns off the main power supply and comes to be on standby for receiving signals.

After all the image data recorded in the recording medium 13 is thus transmitted to the image recording apparatus 20, the image data is automatically erased from the recording medium 13, and the number of recordable images of the recording medium 13 returns to the original (maximum).

In this embodiment, when the number of possible images calculated according to the residual capacity of the recording medium 13 becomes five, the image capturing apparatus 10 transmits the image data to the image recording apparatus 20. The present invention, however, should not be restricted to this. The transmission may be started when the residual capacity of the recording medium 13 reaches a predetermined threshold. The user may arbitrarily set the threshold residual number of recordable images or the threshold residual capacity, which is the reference for deciding the transmission timing. The image capturing apparatus 10 transmits the command signal for turning off the power supply of the image recording apparatus 20 after the completion of the image data transmission, but the present invention should not be restricted to this. The image recording apparatus 20 may be provided with an automatic power off function for turning off the main power supply automatically when a predetermined period has passed since the completion of the image data storage.

A description will now be given of the case where the image capturing apparatus 10 receives the image data that has already been stored in the image recording apparatus 20 with reference to the flow chart of FIG. 4.

Figure 4:
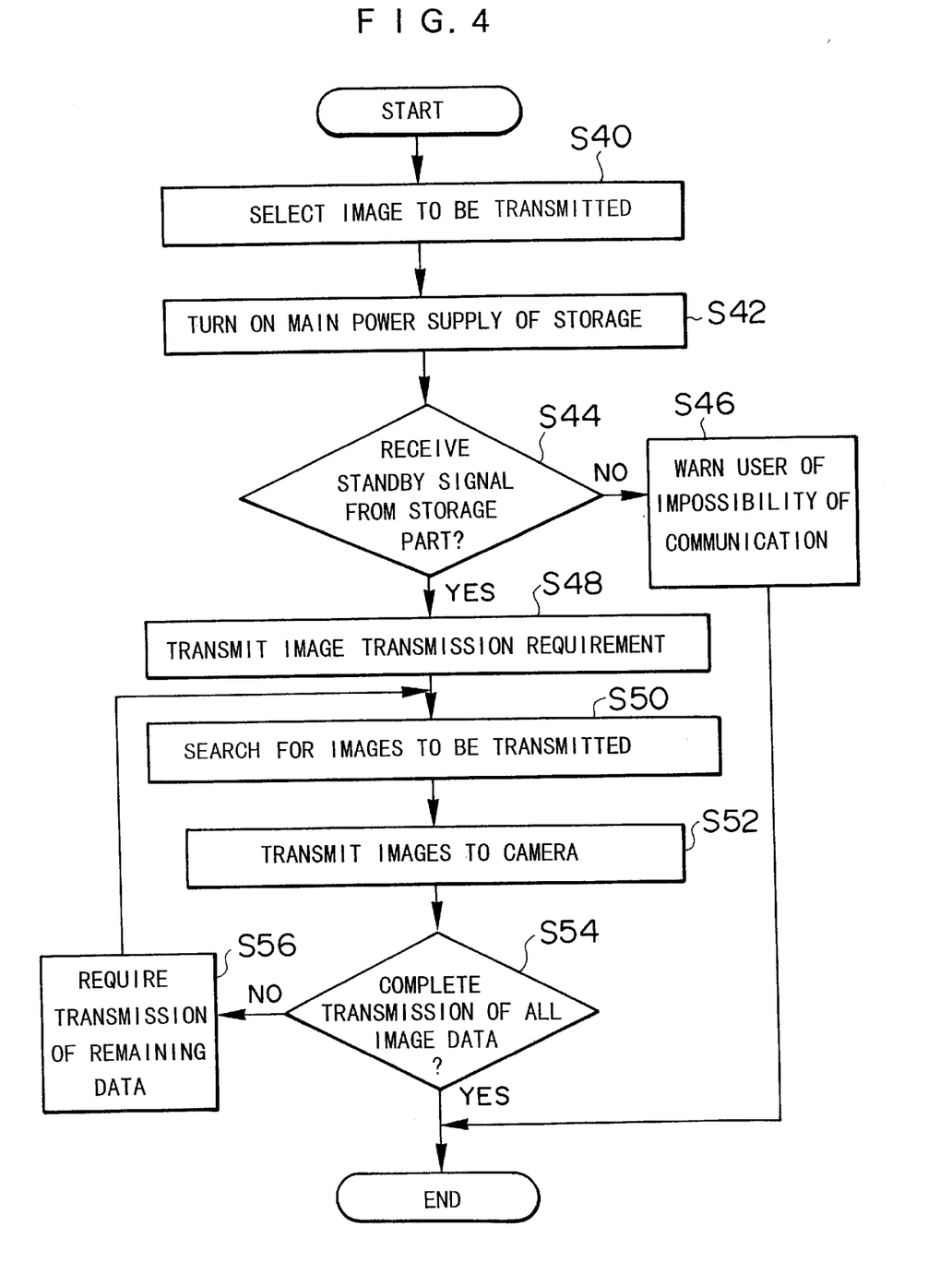
FIG. 4 is another flow chart of assistance in explaining the operation of the image capturing and recording system in FIG. 1.

As shown in FIG. 4, at least one image to be transmitted from the image recording apparatus 20 to the image capturing apparatus 10 is selected at the image capturing apparatus 10 (S40). The image may be selected according to a transmission unit in which the image data was transmitted to the image recording apparatus 20 (according to the transmission date when the image data was transmitted to the image recording apparatus 20, an identifier of each transmission unit, or the like). Alternatively, the image may be selected according to image information such as the date and time of being captured.

Then, the command signal for turning on the power supply of the image recording apparatus 20 is transmitted (S42) and whether the image capturing apparatus 10 has received the standby signal from the image recording apparatus 20 or not is determined (S44) as is the case with S20 and S22 in FIG. 3 (S42). If no at S44, the image capturing apparatus 10 determines that it is impossible to communicate with the image recording apparatus 20, and warns the user of the impossibility of communication to finish the operation (S46).

If yes at S44, the image capturing apparatus 10 transmits image transmission requirement for requiring transmission of the at least one image selected at S40 and number of images that can be received by the image capturing apparatus 10 (S48). In accordance with the image transmission requirement and the number of receivable images, the image recording apparatus 20 searches for the required image data from the image data stored in the image storage part 28 and prepares the image data to be transmitted (S50).

Then, the image recording apparatus 20 transmits the prepared image data to the image capturing apparatus 10 (S52). At the same time, the image recording apparatus 20 transmits number of searched images and number of images to be transmitted. If the number of searched images is more than the number of images that can be received by the image capturing apparatus 10, the image recording apparatus 20 transmits the images of the receivable number at first, and then prepares for the transmission of the next transmission data in accordance with the requirement from the image capturing apparatus 10. If there is an image erasure requirement, the image recording apparatus 20 erases designated images.

At S54, the image capturing apparatus 10 determines whether the transmission of all the image data is complete or not. If no at S54, the image capturing apparatus 10 requires the image recording apparatus 20 to transmit the remaining data (S56), and the process goes back to S50. The image recording apparatus 20 thus transmits the required image data to the image capturing apparatus 10, and turns off the main power supply of the image recording apparatus 20 in accordance with the command signal from the image capturing apparatus 10 after the transmission of all the image data is completed.

A description will now be given of another case where the image capturing apparatus 10 receives the image data that has already been stored in the image recording apparatus 20 with reference to the flow chart of FIG. 5, in which steps similar to those described with reference to FIG. 4 are denoted by the same reference numerals, and they will not be described.

Figure 5:
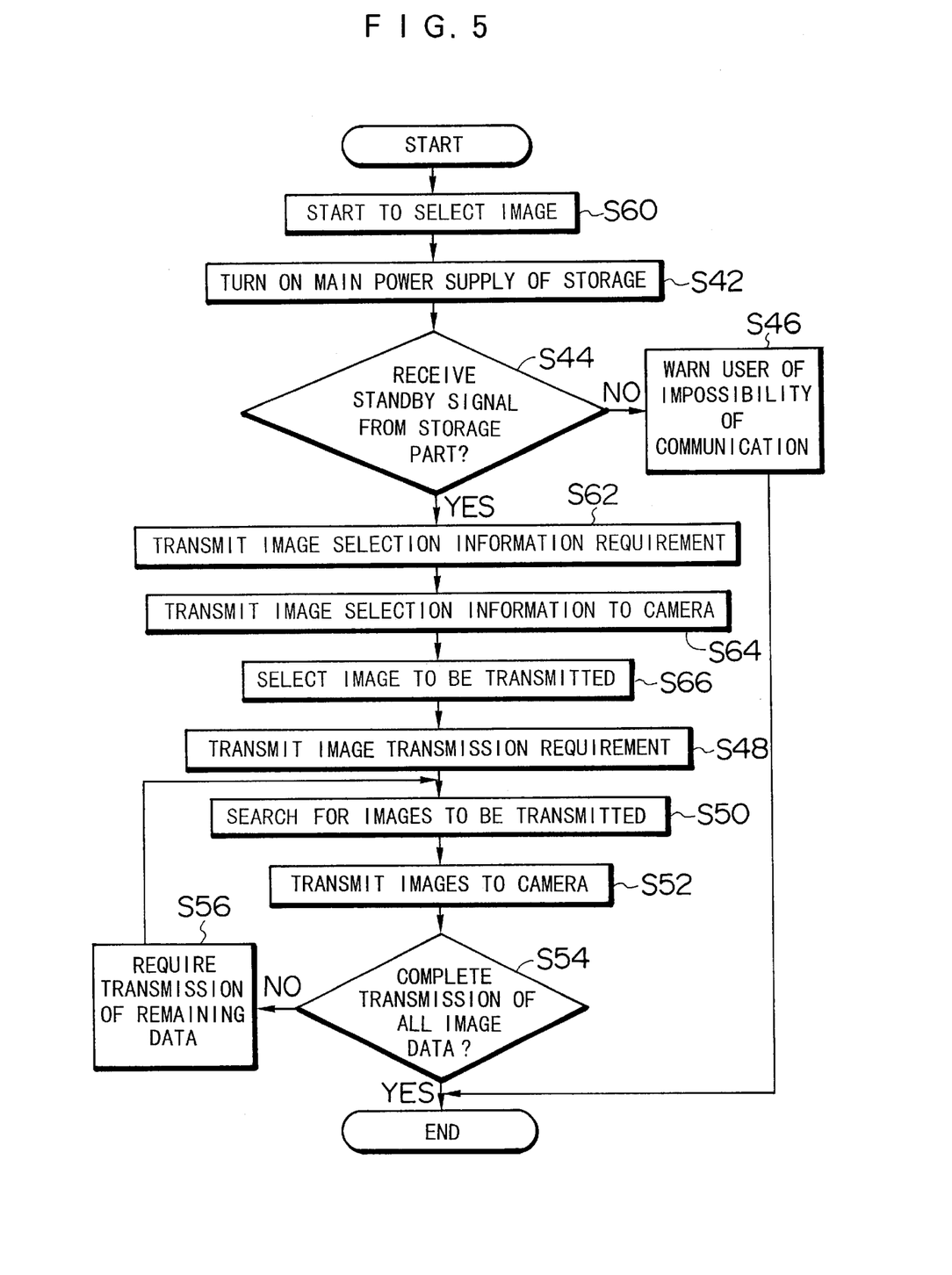
FIG. 5 is yet another flow chart of assistance in explaining the operation of the image capturing and recording system in FIG. 1.

The case shown in FIG. 5 is different from that described with reference to FIG. 4 in that: the image capturing apparatus 10 has no information needed to select a specific image (image selection information) at first, and the image capturing apparatus 10 later receives the image selection information from the image recording apparatus 20.

As shown in FIG. 5, when the procedure is started in the image capturing apparatus 10 to select an image to retrieve the image data from the image recording apparatus 20 (S60), the image capturing apparatus 10 transmits the command signal for turning on the power supply of the image recording apparatus 20 (S42). Then, upon receipt of the standby signal from the image recording apparatus 20 at S44, the image capturing apparatus 10 transmits a command signal to require the image selection information to the image recording apparatus 20 (S62). Upon receipt of the image selection information requirement from the image capturing apparatus 10, the image recording apparatus 20 transmits the image selection information to the image capturing apparatus 10 (S64). The image selection information may be any information usable to select an image, and may be the tag information attached to each image stored in the image recording apparatus 20 such as the name of the image file, the date and time of being captured, and the title of the image.

After receipt of the image selection information, at least one image to be transmitted from the image recording apparatus 20 to the image capturing apparatus 10 is selected at the image capturing apparatus 10 (S66). Then, the image capturing apparatus 10 transmits image transmission requirement for requiring transmission of the at least one image selected at S66 and number of images that can be received by the image capturing apparatus 10 (S48). The succeeding procedure is the same as that in FIG. 4.

In these embodiments, the image capturing apparatus 10 transmits the image data after turning on the power supply of the image recording apparatus 20, but the present invention should not be restricted to this. For example, the image capturing apparatus 10 may produce an index image of the captured images and transmit the index image. When the image capturing apparatus 10 receives image data, it may require the image recording apparatus 20 to transmit the index image, and then, the user may specifically designate images with reference to the received index image.

In these embodiments, the image recording apparatus 20 stores the images received from the image capturing apparatus 10 in the large-capacity image storage part 28, but the present invention should not be restricted to this. For example, a printer may be provided instead of the image storage part 28 so as to print images on printing paper in accordance with the image data received from the image capturing apparatus 10, or both the image storage part 28 and the printer may be provided.

In these embodiments, the image capturing apparatus 10 and the image recording apparatus 20 have the wireless communication to each other by means of the radio wave, but the present invention should not be restricted to this.

Instead of the radio wave, any kind of carrier such as infrared light and ultrasound can be used to secure the wireless communication between the image capturing apparatus 10 and the image recording apparatus 20. Furthermore, the communication between the image capturing apparatus 10 and the image recording apparatus 20 may be indirect. For example, the image capturing apparatus 10 may be connected to the image recording apparatus 20 through the mobile telephone system, which may be either public or private.

As set forth hereinabove, the images are transmitted collectively when the residual capacity of the small-capacity recording device in the image capturing apparatus becomes little, and this improves the transmission efficiency, and prevents the loss of the battery in the image capturing apparatus. Moreover, the images can be transmitted automatically without the operation by the user. Furthermore, the image capturing apparatus controls the power supply of the image recording apparatus, and this prevents the loss of the power in the image recording apparatus. In addition, the image capturing apparatus controls the image recording apparatus to require the transmission of the stored images and erase the stored images.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image capturing apparatus, comprising:
    an imaging part;
    a first recording part that records a predetermined amount of data of images captured by the imaging part; and
    a communication part that wirelessly communicates with an image recording apparatus comprising at least one of a printer and a second recording part having a capacity larger than the first recording part, and that transmits a first command signal to the image recording apparatus to turn on a power supply to at least one of the printer and the second recording part when a residual capacity of the first recording part becomes less than a predetermined threshold and then transmits at least one of the images recorded in the first recording part to the image recording apparatus,
    wherein the communication part transmits a second command signal to the image recording apparatus to turn off the power supply of the image recording apparatus when transmission of the at least one of the images recorded in the first recording part to the image recording apparatus is completed.

2. The image capturing apparatus as defined in claim 1, further comprising an erasing device that automatically erases, from the first recording part, the at least one of the images having been transmitted to the image recording apparatus.

3. The image capturing apparatus as defined in claim 1, wherein:
    the communication part wirelessly communicates with the image recording apparatus comprising the second recording part;
    the image capturing apparatus further comprises a retrieved image selecting device that selects at least one image having been recorded in the second recording part to be transmitted to the image capturing apparatus; and
    the communication part transmits the first command signal to the image recording apparatus to turn on the power supply to the second recording part when the retrieved image selecting device selects the at least one image to be transmitted to the image capturing apparatus, and then transmits a third command signal to the image recording apparatus to transmit the at least one image selected by the retrieved image selecting device from the image recording apparatus to the image capturing apparatus.

4. The image capturing apparatus as defined in claim 1, wherein:
    the communication part wirelessly communicates with the image recording apparatus comprising the second recording part;
    the image capturing apparatus further comprises an erased image selecting device that selects at least one image having been recorded in the second recording part to be erased from the second recording part; and
    the communication part transmits the first command signal to the image recording apparatus to turn on the power supply to the second recording part when the erased image selecting device selects the at least one image to be erased from the second recording part, and then transmits a fourth command signal to the image recording apparatus to erase the at least one image selected by the erased image selecting device from the second recording part.

5. The image capturing apparatus as defined in claim 1, wherein:
    the communication part wirelessly communicates with the image recording apparatus comprising the second recording part;
    the image capturing apparatus further comprises a retrieved image selecting device that receives image selection information from the image recording apparatus, and that selects, with reference to the image selection information, at least one image having been recorded in the second recording part to be transmitted to the image capturing apparatus; and
    when a retrieved image selection procedure at the retrieved image selecting device is started, the communication part transmits the first command signal to the image recording apparatus to turn on the power supply to the second recording part and then transmits a fifth command signal to the image recording apparatus to transmit the image selection information to the image capturing apparatus, and then, when the retrieved image selecting device selects the at least one image to be transmitted to the image capturing apparatus, the communication part transmits a third command signal to the image recording apparatus to transmit the at least one image selected by the retrieved image selecting device from the image recording apparatus to the image capturing apparatus.

6. The image capturing apparatus as defined in claim 1, wherein:
    the communication part wirelessly communicates with the image recording apparatus comprising the second recording part;
    the image capturing apparatus further comprises an erased image selecting device that receives image selection information from the image recording apparatus, and that selects, with reference to the image selection information, at least one image having been recorded in the second recording part to be erased from the second recording part; and when an erased image selection procedure at the erased image selecting device is started, the communication part transmits the first command signal to the image recording apparatus to turn on the power supply to the second recording part and then transmits a fifth command signal to the image recording apparatus to transmit the image selection information to the image capturing apparatus, and then, when the erased image selecting device selects the at least one image to be erased from the second recording part, the communication part transmits a fourth command signal to the image recording apparatus to erase the at least one image selected by the erased image selecting device from the second recording part.

7. An image recording apparatus, comprising:
   a communication part that wirelessly communicates with an image capturing apparatus and receives at least one image from the image capturing apparatus;
   at least one of a printer and a recording part that records the at least one image received from the image capturing apparatus; and
   a power supply part that makes the communication part on standby for receiving, from the image capturing apparatus, a first command signal to turn on a power supply to the at least one of the printer and the recording part, and that turns on the power supply in response to the first command signal from the image capturing apparatus and then turns off the power supply and makes the communication part on the standby upon at least one of receipt of a second command signal to turn off the power supply from the image capturing apparatus and passage of a predetermined period after completion of reception of the at least one image from the image capturing apparatus.

8. An image capturing and recording system comprising an image capturing apparatus and an image recording apparatus, wherein:
   the image capturing apparatus comprises:
      an imaging part;
      a first recording part that records a predetermined amount of data of images captured by the imaging part; and
      a first communication part that wirelessly communicates with the image recording apparatus and that transmits a first command signal to the image recording apparatus to turn on a power supply to at least one of a printer and a second recording part of the image recording apparatus when a residual capacity of the first recording part becomes less than a predetermined threshold and then transmits at least one of the images recorded in the first recording part to the image recording apparatus; and
   the image recording apparatus comprises:
      a second communication part that wirelessly communicates with the image capturing apparatus and receives the at least one of the images transmitted from the image capturing apparatus;
      the at least one of the printer and the second recording part having a capacity larger than the first recording part, the at least one of the printer and the second recording part recording the at least one of the images received from the image capturing apparatus; and
      a power supply part that makes the communication part on standby for receiving the first command signal from the image capturing apparatus, and that turns on the power supply in response to the first command signal from the image capturing apparatus and then turns off the power supply and makes the communication part on the standby for receiving the first command signal upon at least one of receipt of a second command signal to turn off the power supply from the image capturing apparatus and passage of a predetermined period after completion of reception of the at least one of the images from the image capturing apparatus.

9. An image transmission-reception method for transmitting and receiving an image between an image capturing apparatus and an image recording apparatus, wherein:
   the image capturing apparatus transmits a first command signal to the image recording apparatus to turn on a power supply of the image recording apparatus when an amount of data of images recorded in a first recording part of the image capturing apparatus reaches a predetermined amount, and then transmits at least one of the images recorded in the first recording part to the image recording apparatus; and
   the image recording apparatus turns on the power supply in response to the first command signal from the image capturing apparatus to get activated from being on standby for receiving the first command signal from the image capturing apparatus, and then receives the at least one of the images transmitted from the image capturing apparatus and records the at least one of the images received from the image capturing apparatus on at least one of printing paper and a second recording part having a capacity larger than the first recording part, wherein:
      the image capturing apparatus transmits a second command signal to the image recording apparatus to turn off the power supply of the image recording apparatus when transmission of the at least one of the images recorded in the first recording part to the image recording apparatus is completed; and
      the image recording apparatus turns off the power supply and becomes on the standby upon receipt of the second command signal to turn off the power supply from the image capturing apparatus.

10. The image transmission-reception method as defined in claim 9, wherein the image capturing apparatus automatically erases, from the first recording part, the at least one of the images having been transmitted to the image recording apparatus.

11. The image transmission-reception method as defined in claim 9, wherein the image recording apparatus turns off the power supply and becomes on the standby upon passage of a predetermined period after completion of reception of the at least one of the images from the image capturing apparatus.

12. The image transmission-reception method as defined in claim 9, wherein:
   the image recording apparatus records the at least one of the images received from the image capturing apparatus;
   when at least one image having been recorded in the image recording apparatus to be transmitted to the image capturing apparatus is selected, the image capturing apparatus transmits the first command signal to turn on the power supply of the image recording apparatus and then transmits a third command signal to the image recording apparatus to transmit the at least one image selected by the image capturing apparatus from the image recording apparatus to the image capturing apparatus; and the image recording apparatus turns on the power supply in response to the first command signal from the image capturing apparatus to get activated from being on the standby, and transmits, in response to the third command signal, the at least one image recorded in the image recording apparatus corresponding to the third command signal to the image capturing apparatus.

13. The image transmission-reception method as defined claim 9, wherein:

the image recording apparatus records the at least one of the images received from the image capturing apparatus;

when at least one image having been recorded in the image recording apparatus to be erased from the image recording apparatus is selected, the image capturing apparatus transmits the first command signal to turn on the power supply of the image recording apparatus and then transmits a fourth command signal to the image recording apparatus to erase the at least one image selected by the image capturing apparatus from the image recording apparatus; and the image recording apparatus turns on the power supply in response to the first command signal from the image capturing apparatus to get activated from being on the standby, and erases, in response to the fourth command signal, the at least one image recorded in the image recording apparatus corresponding to the fourth command signal.

14. The image transmission-reception method as defined in claim 9, wherein:

the image recording apparatus records the at least one of the images received from the image capturing apparatus;

when a retrieved image selection procedure to select at least one image having been recorded in the image recording apparatus to be transmitted to the image capturing apparatus is started, the image capturing apparatus transmits the first command signal to turn on the power supply of the image recording apparatus and then transmits a fifth command signal to the image recording apparatus to transmit image selection information to be used in the retrieved image selection procedure to the image capturing apparatus;

the image recording apparatus turns on the power supply in response to the first command signal from the image capturing apparatus to get activated from being on the standby, and transmits the image selection information to the image capturing apparatus in response to the fifth command signal;

when the at least one image to be transmitted to the image capturing apparatus is selected at the image capturing apparatus, the image capturing apparatus transmits a third command signal to the image recording apparatus to transmit the at least one image selected by the image capturing apparatus from the image recording apparatus to the image capturing apparatus; and the image recording apparatus transmits, in response to the third command signal, the at least one image recorded in the image recording apparatus corresponding to the third command signal to the image capturing apparatus.

15. The image transmission-reception method as defined in claim 9, wherein:

the image recording apparatus records the at least one of the images received from the image capturing apparatus;

when an erased image selection procedure to select at least one image having been recorded in the image recording apparatus to be erased from the image recording apparatus is started, the image capturing apparatus transmits the first command signal to turn on the power supply of the image recording apparatus and then transmits a fifth command signal to the image recording apparatus to transmit image selection information to be used in the erased image selection procedure to the image capturing apparatus;

the image recording apparatus turns on the power supply in response to the first command signal from the image capturing apparatus to get activated from being on the standby, and transmits the image selection information to the image capturing apparatus in response to the fifth command signal;

when the at least one image to be erased from the image recording apparatus is selected at the image capturing apparatus, the image capturing apparatus transmits a fourth command signal to the image recording apparatus to erase the at least one image selected by the image capturing apparatus from the image recording apparatus; and the image recording apparatus erases, in response to the fourth command signal, the at least one image recorded in the image recording apparatus corresponding to the fourth command signal.

* * * * *